United States Patent
Kelly et al.

(10) Patent No.: US 9,538,878 B2
(45) Date of Patent: Jan. 10, 2017

(54) FROTH WAND FOR ESPRESSO MAKER

(71) Applicant: AEROSPACE, INC., Wellington, FL (US)

(72) Inventors: Luke Kelly, Bonner Springs, KS (US); Keith R. DeBald, Gardner, KS (US)

(73) Assignee: B/E Aerospace, Inc., Wellington, FL (US)

( * ) Notice: Subject to any disclaimer, the term of this patent is extended or adjusted under 35 U.S.C. 154(b) by 100 days.

(21) Appl. No.: 14/685,072

(22) Filed: Apr. 13, 2015

(65) Prior Publication Data

US 2015/0208854 A1    Jul. 30, 2015

Related U.S. Application Data

(63) Continuation of application No. 13/849,314, filed on Mar. 22, 2013, now Pat. No. 9,016,670.

(60) Provisional application No. 61/615,486, filed on Mar. 26, 2012.

(51) Int. Cl.
*B01F 3/04*    (2006.01)
*A47J 31/44*    (2006.01)

(52) U.S. Cl.
CPC ........ *A47J 31/4489* (2013.01); *B01F 3/04446* (2013.01); *Y10S 261/76* (2013.01)

(58) Field of Classification Search
CPC .................................. A47J 31/4489
USPC ... 261/76, 77, 78.2, 118, DIG. 76; 99/323.1; 426/474; 141/70; 366/101
See application file for complete search history.

(56) References Cited

U.S. PATENT DOCUMENTS

| | | |
|---|---|---|
| 6,644,177 B1 | 11/2003 | Hsu |
| 6,786,138 B2 | 9/2004 | Johnson et al. |
| 7,810,426 B2 | 10/2010 | Balkau et al. |
| 2003/0131735 A1 | 7/2003 | Johnson et al. |
| 2006/0236874 A1 | 10/2006 | Ozanne |
| 2012/0073449 A1 | 3/2012 | Volont et al. |

FOREIGN PATENT DOCUMENTS

| | | |
|---|---|---|
| DE | 3942713 A1 | 6/1991 |
| WO | 9014774 A1 | 12/1990 |
| WO | 2010121299 A1 | 10/2010 |

OTHER PUBLICATIONS

International Search Report, Sep. 3, 2013, 3 pages, from PCT/US13/033734, published as WO2013/148592 on Oct. 3, 2013.

*Primary Examiner* — Robert A Hopkins
(74) *Attorney, Agent, or Firm* — Shumaker, Loop & Kendrick, LLP

(57) ABSTRACT

The present invention is a froth wand for an espresso machine that can generate a high velocity stream of steam to foam a beverage at the beverage brewing apparatus. The wand includes an adapter for attaching to the beverage brewing machine at a steam supply outlet, and a conduit for communicating the steam to a steam tube. The steam tube has a cylindrical body with an annular recessed exit, and is surrounded by a cylindrical sheath. The sheath includes a cylindrical plug with a small longitudinal aperture that fits into the outlet of the steam tube. The mating of the sheath's plug and the steam tube forces the steam through the aperture, accelerating the steam at the exit.

7 Claims, 4 Drawing Sheets

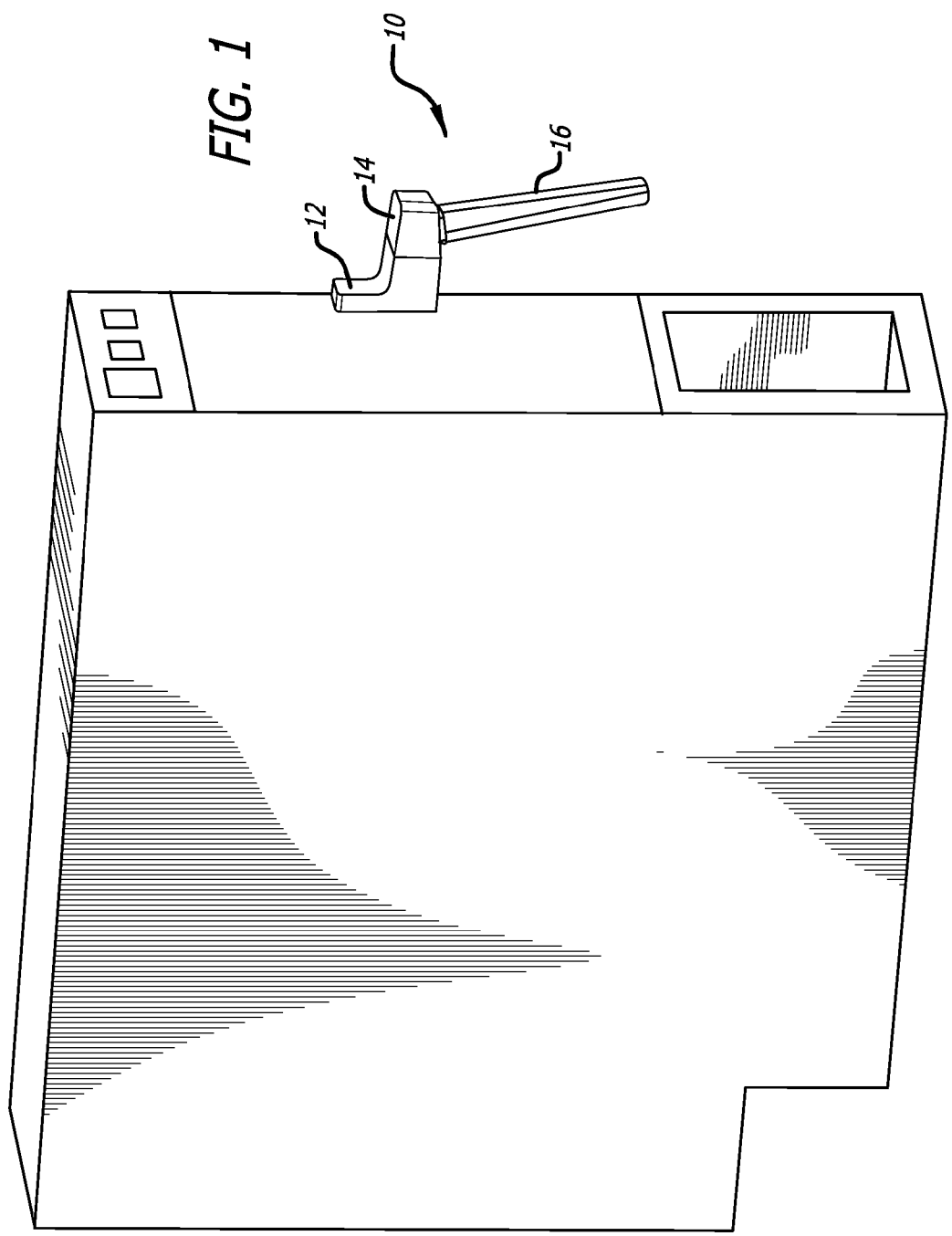

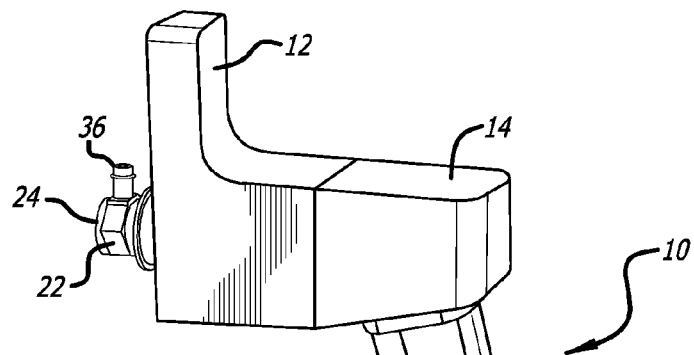
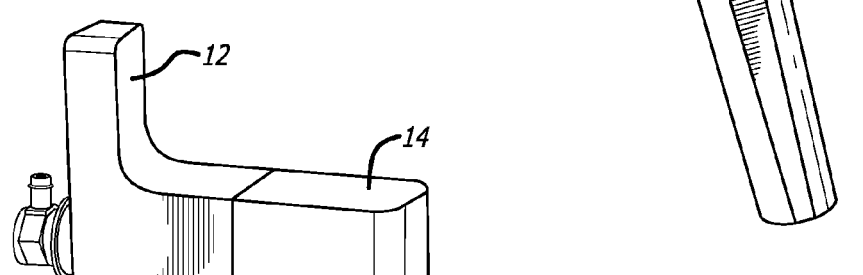
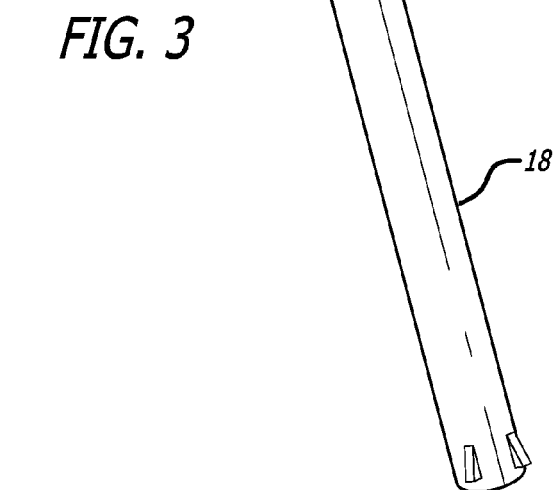

FROTH WAND FOR ESPRESSO MAKER

CROSS-REFERENCES TO RELATED APPLICATIONS

This application is a continuation based on U.S. Ser. No. 13/849,314, filed on Mar. 22, 2013, which claims priority from U.S. Application No. 61/615,486, filed Mar. 26, 2012, the contents of which are incorporated herein by reference in its entirety.

BACKGROUND

There are many different types of espresso drinks today made popular by the ubiquitous coffee houses that can be found on nearly every corner. Espresso drinks are made with one or more shots of espresso, a beverage made from a particular coffee bean. Espresso is made by forcing hot water through tightly packed, finely ground espresso coffee. For many of these drinks, it is traditional to top off the drink with a froth, which is created by an attachment on the espresso maker called a froth wand. The froth wand generates a foam by forcing pressurized air into the beverage, forming a bubbles that collate into a foamy mix that is pleasing to the taste and adds aesthetic benefits to the beverage.

Espresso froth wands are typically long tubes that are connected to a source of pressurized air and extends rigidly from a base of the coffee brewing machine. One difficulty with existing espresso wands is that they frequently clog due to milk or other beverages collecting and drying inside of the tube. Also, the position of the wand is sometimes challenging to maneuver, particularly when the espresso machine is located in confined quarters such as an aircraft galley. The present invention is a novel froth wand for an espresso maker that addresses some of the shortcomings of the prior art.

SUMMARY OF THE INVENTION

The present invention is a froth wand for an espresso machine that can generate a high velocity stream of steam to foam a beverage at the beverage brewing apparatus. The wand includes an adapter for attaching to the beverage brewing machine at a steam supply outlet, and a conduit for communicating the steam to a steam tube. In a preferred embodiment, the steam tube can rotate about the conduit so as to swivel about at least one hundred eighty degrees, although other arcs of rotation are also possible up to a full three hundred and sixty degrees. The steam tube has a cylindrical body with an annular recessed exit, and is surrounded by a cylindrical sheath. The sheath includes a cylindrical plug with a small longitudinal aperture that fits into the outlet of the steam tube. The mating of the sheath's plug and the steam tube forces the steam through the aperture, accelerating the steam at the exit. Ports or windows on the sheath adjacent the aperture provide a path for rising foam or froth to collect in the gap between the steam tube and the sheath, preventing spillage of the beverage during the frothing process. When the beverage is removed from the froth wand, the excess foam flows gently back to the cup to provide a smooth foamy topping to the beverage.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1 is an elevated, perspective view of an espresso machine having a froth wand of the present invention;

FIG. 2 is an enlarged perspective view of the froth wand of the present invention;

FIG. 3 is an enlarged perspective view of the froth wand of FIG. 2 with the outer sheath removed;

DETAILED DESCRIPTION OF THE PREFERRED EMBODIMENTS

Figure 4:
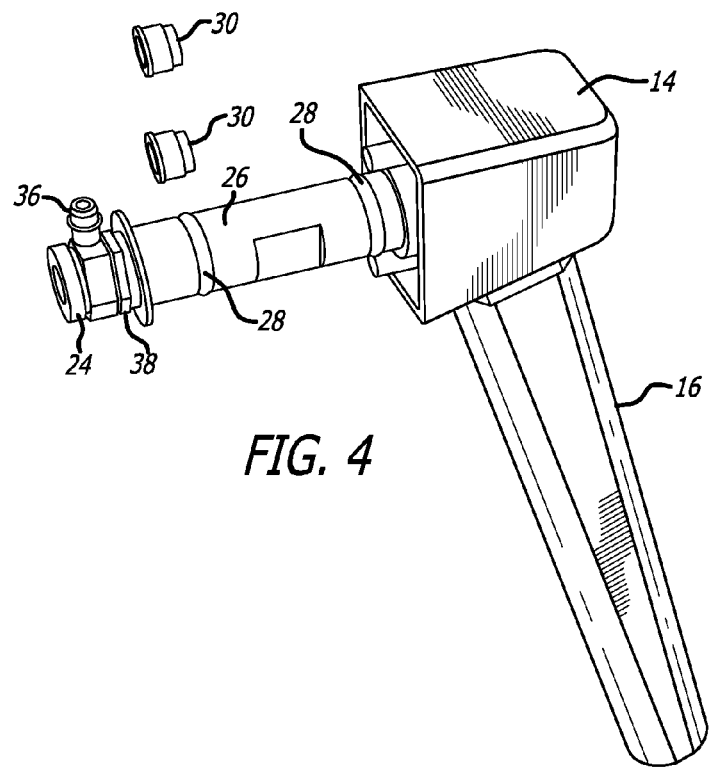
FIG. 4 is an enlarged perspective view of the froth wand of FIG. 2 with the housing removed.

FIGS. 1 and 2 illustrate a first embodiment of the present invention comprising a froth wand 10 having a base portion 12 that attaches to the front of an espresso machine 15, a rotating housing 14 and a replaceable froth wand sheath 16. The housing 14 rotates with respect to the base 12, up to +/−90° in a preferred embodiment, although the head can swivel 360° if desired. Inside the sheath 16 is an inner froth wand steam tube 18, as shown in FIG. 3. Steam is passed along the steam tube 18 to the beverage from a steam generating unit on the espresso machine 15. The froth wand sheath 16 is held onto the steam tube 18 by virtue of a friction fit with a pair of o-rings 20, that also serve to seal unit and prevent moisture from returning up the gap between the sheath 16 and the steam tube 18 to the housing 14. It is important to shield the unit from steam, as it can cause premature degradation and/or corrosion of the parts if continually exposed to the high temperatures and moisture. The o-rings 20 are removable with the use of a hand tool and easily replaced, adding to the convenience of the present invention.

The base portion 12 includes a coupling 22 that mates with a port or hose from the steam generating unit of the espresso machine 15. The coupling 22 comprises a washer 24 to ensure a water and air tight seal, and a relief valve 36 at the inlet to prevent over-pressurization at the inlet to the froth wand.

FIG. 4 illustrates the froth wand with the base 12 removed, revealing a multi-piece conduit 26 including a second pair of o-rings 28 that: a) seal the conduit as the wand is rotated, and b) frictionally hold the froth wand in place after a rotation. The o-rings 12 are seated on connectors 30 or links that connect the tubular elements of the multi-piece conduit 26 to allow rotation of the multi-piece conduit 26 so that the wand can rotate about a longitudinal axis of the conduit. FIG. 4 also illustrates the washer 24 and a threaded fastener 38 that connects to the multi-piece conduit 26 at the steam generating unit.

Figure 5:
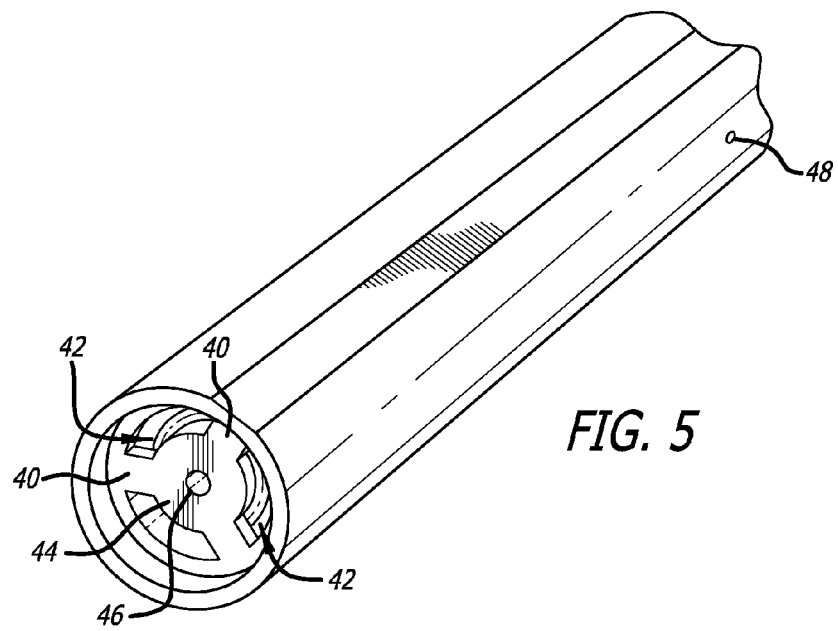
FIG. 5 is an enlarged perspective view of the tip of the froth wand.

FIG. 5 illustrates the end of the wand sheath, where three spokes 40 emanating from a central hub 44 define three arcuate windows 42 along with a central hole 46. The central hub 44 extends rearward until it abuts the exit of the steam tube 18, mating with the exit of the steam tube. Steam exits the steam tube 18 and, due to the abutment of the central hub 44 of the sheath 16, is forced through into the central hub 44 and through the central hole 46, accelerating as it passes through the smaller opening. This accelerated steam flow is submerged in the beverage, creating a microfoam that builds in the upper surface of the beverage. The foam rises at the surface of the cup, and the sheath 16 incorporates a collection reservoir between the sheath and the steam tube to prevent overflow. The windows 42 allow the foam to slightly rise into the sheath interior, preventing spillage of the beverage due to the expanding foam or froth. A small air hole 48 on the sheath allows air to escape as the froth fills the gap between the sheath and the steam tube.

Figure 6:
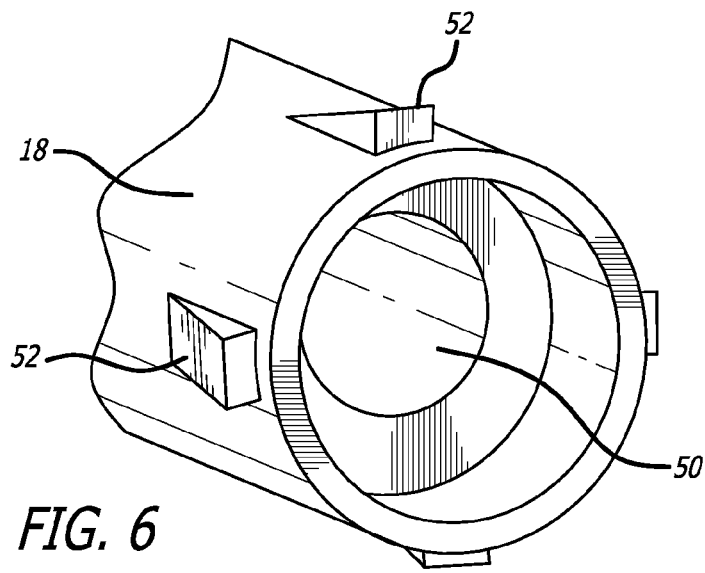
FIG. 6 is an enlarged perspective view of the end of the sheath.
Figure 7:
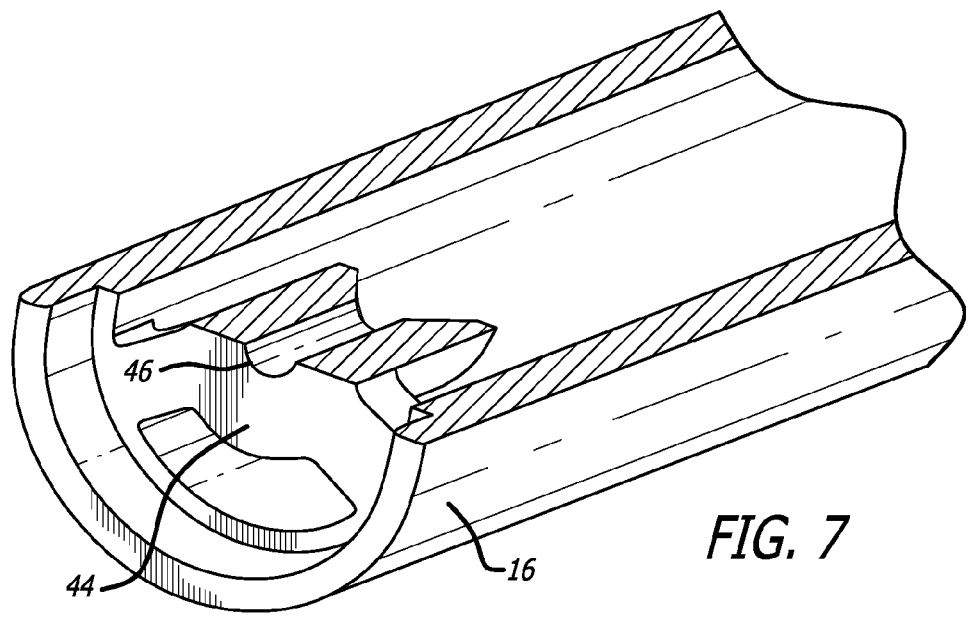
FIG. 7 is a cross sectional view of the end of the sheath.

FIG. 6 illustrates the end of the steam tube 18, including a recess at the distal end surrounding the exit hole 50. The recess is sized to snugly receive the rearward projecting central hub 44 of the sheath 16 so that the sheath plugs the steam tube, and the steam exiting the exit hole 50 is forced through the central hole 46 of the central hub 44 and streams into the beverage to create the micro-foam. Radially projecting notches 52 on the outside of the steam tube 18 can bear against the inner wall of the sheath 16 to stabilize and support the sheath thereon. FIG. 7 is a cut-away view of the end of the sheath 16, showing how the central hub 44 extends into the sheath interior such that it can abut the exit of the steam tube 18 within the recess.

In operation, the froth wand is connected at the base to the outlet of a steam generating unit on the beverage brewing machine. The steam tube and sheath is placed in a cup of cappuccino or other beverage such that the distal end is submerged. Steam enters the froth wand at the coupling 22 and passes through the multi-piece conduit 26, where it enters the steam tube 18. The end of the steam tube 18 is recessed for receiving the hub of the sheath 16, which forces the steam through a small outlet 46 that accelerates the steam into the beverage, creating a foam at the surface of the beverage. Windows 42 allow some of the foam to rise into the sheath to prevent overflow and possible spillage as the frothing process continues. This excess froth is released gently back into the cup as the froth wand is removed, completing the frothing process.

Although various embodiments have been described, it is to be understood that various modifications and substitutions would be appreciated by one of ordinary skill in the art, and the present invention is intended to include all such modifications and substitutions. Accordingly, nothing in this specification or the drawings should be construed as limiting or exclusive unless expressly indicated. Rather, the scope of the invention is measured by appended claims, using the plain and ordinary meaning of the words in view of, but not exclusive to, the description herein.

We claim:

1. A froth wand for a beverage brewing apparatus, comprising:
    a coupling that connects the froth wand to a steam supply of the beverage brewing apparatus;
    a conduit for communicating steam received at the coupling;
    a hollow steam tube connected to the conduit, the steam tube including projections along an outer surface and an annular recess as an exit; and
    a sheath releasably disposed over the steam tube and engaged with the projections to secure the sheath thereon, the sheath further comprising a cylindrical hub at a distal end that engages the annular recess of the steam tube to provide a mating engagement therebetween, the cylindrical hub including an aperture having a diameter that is smaller than a diameter of the exit of the steam tube such that steam transitioning from the steam tube to the cylindrical hub of the sheath is accelerated.

2. The froth wand of claim 1, wherein the sheath includes a plurality of windows about the aperture.

3. The froth wand of claim 1, wherein the conduit is comprised of multiple links that rotate with respect to each other.

4. The froth wand of claim 1, further comprising a housing enclosing the conduit.

5. The froth wand of claim 1, wherein the sheath further comprises an air hole spaced from the exit to allow air to be evacuated from the sheath as foam enters the sheath through the window.

6. The froth wand of claim 1, wherein the steam tube rotates about the conduit through an arc of at least one hundred and eighty degrees.

7. The froth wand of claim 1, wherein the steam tube rotates about the conduit through an arc of three hundred and sixty degrees.

* * * * *

UNITED STATES PATENT AND TRADEMARK OFFICE
CERTIFICATE OF CORRECTION

PATENT NO. : 9,538,878 B2  
APPLICATION NO. : 14/685072  
DATED : January 10, 2017  
INVENTOR(S) : Luke Kelly et al.

Page 1 of 1

It is certified that error appears in the above-identified patent and that said Letters Patent is hereby corrected as shown below:

On the Title Page

Item (71) Applicant: should read B/E Aerospace, Inc.

Signed and Sealed this  
Ninth Day of May, 2017

Michelle K. Lee  
*Director of the United States Patent and Trademark Office*